(12) United States Patent
Watson et al.

(10) Patent No.: US 10,783,679 B2
(45) Date of Patent: Sep. 22, 2020

(54) CIRCULAR VISUAL REPRESENTATION OF MEDIA CONTENT

(71) Applicant: Disney Enterprises, Inc., Burbank, CA (US)

(72) Inventors: Katherine Watson, New Haven, CT (US); Markus Gross, Zurich (CH); Sasha Anna Schriber, Zurich (CH)

(73) Assignee: Disney Enterprises Inc., Burbank, CA (US)

( * ) Notice: Subject to any disclaimer, the term of this patent is extended or adjusted under 35 U.S.C. 154(b) by 0 days.

(21) Appl. No.: 15/419,679

(22) Filed: Jan. 30, 2017

(65) Prior Publication Data
US 2018/0218520 A1     Aug. 2, 2018

(51) Int. Cl.
*G06T 11/20* (2006.01)
*G06F 3/0482* (2013.01)

(52) U.S. Cl.
CPC .......... *G06T 11/206* (2013.01); *G06F 3/0482* (2013.01)

(58) Field of Classification Search
CPC .... G06Q 40/00; G06Q 50/01; G06F 3/04845; G06F 19/3406; G06F 17/30572; G06F 17/30327; G06T 11/206; A61B 5/0015
USPC ....................................................... 345/440
See application file for complete search history.

(56) References Cited

U.S. PATENT DOCUMENTS

| 6,243,740 | B1 * | 6/2001 | Minneman | G06Q 10/10 348/E7.061 |
| 9,430,115 | B1 * | 8/2016 | Yun | G06F 3/048 |
| 9,557,881 | B1 * | 1/2017 | Jain | G06F 3/0481 |
| 9,916,382 | B1 * | 3/2018 | Clarke | G06F 16/7328 |
| 9,990,746 | B2 * | 6/2018 | Ni | G06T 11/60 |
| 2003/0048309 | A1 * | 3/2003 | Tambata | G01C 21/3664 715/810 |

(Continued)

OTHER PUBLICATIONS

Tapaswi, Makarand, Martin Bauml, and Rainer Stiefelhagen. "Storygraphs: visualizing character interactions as a timeline." Proceedings of the IEEE Conference on Computer Vision and Pattern Recognition. 2014.*
Huang, et al. "VizStory: Visualization of Digital Narrative for Fairy Tales," 2013 *Conference on Technologies and Applications of Artificial Intelligence*. Dec. 2013. pp. 67-72.

(Continued)

*Primary Examiner* — Sultana M Zalalee
(74) *Attorney, Agent, or Firm* — Farjami & Farjami LLP (57) ABSTRACT

According to one implementation, a system for visualizing media content includes a computing platform including a hardware processor and a system memory, storing a content visualization software code. The hardware processor is configured to execute the content visualization software code to receive a media file, parse the media file to identify a primary content and metadata describing the primary content, and analyze the metadata to determine representative features of the primary content. The hardware processor further executes the content visualization software code to generate a circular visual representation of the primary content based on the metadata and the representative features, the circular visual representation having a non-linear correspondence to at least one of the representative features. The circular visual representation includes a central circle having a central radius, and multiple, at least semicircular segments, each having a respective radius greater than the central radius.

21 Claims, 5 Drawing Sheets

(56) References Cited

U.S. PATENT DOCUMENTS

| | | | |
|---|---|---|---|
| 2005/0055639 A1* | 3/2005 | Fogg | G06Q 10/10 715/262 |
| 2005/0078111 A1* | 4/2005 | Cardno | G06Q 30/02 345/440 |
| 2005/0244804 A1* | 11/2005 | Knight | G06Q 90/00 434/365 |
| 2005/0273807 A1* | 12/2005 | Nissing | H04N 7/24 725/32 |
| 2007/0180408 A1* | 8/2007 | Rusu | G06F 3/0481 715/855 |
| 2008/0207274 A1* | 8/2008 | Kim | H04M 1/72544 455/566 |
| 2008/0313536 A1* | 12/2008 | Larsen | G06Q 10/06 715/273 |
| 2009/0265170 A1* | 10/2009 | Irie | G10L 17/26 704/236 |
| 2009/0289809 A1* | 11/2009 | Gray | G01D 4/002 340/870.11 |
| 2010/0167819 A1* | 7/2010 | Schell | A63F 13/10 463/36 |
| 2011/0282873 A1* | 11/2011 | Mirus | G06F 17/30873 707/737 |
| 2012/0240064 A1* | 9/2012 | Ramsay | G06T 11/00 715/762 |
| 2012/0313971 A1* | 12/2012 | Murata | H04N 21/44008 345/660 |
| 2013/0018896 A1* | 1/2013 | Fleischman | G06Q 50/01 707/748 |
| 2014/0019902 A1* | 1/2014 | DeLuca | G06F 3/04855 715/772 |
| 2014/0181668 A1* | 6/2014 | Kritt | G06F 3/0484 715/719 |
| 2014/0233719 A1* | 8/2014 | Vymenets | H04M 3/5183 379/265.03 |
| 2014/0279625 A1* | 9/2014 | Carter | G06Q 50/01 705/319 |
| 2014/0295787 A1* | 10/2014 | Kim | H04M 15/06 455/405 |
| 2015/0063781 A1* | 3/2015 | Silverman | H04N 21/4126 386/241 |
| 2015/0089366 A1* | 3/2015 | Beckett | G06F 3/0484 715/716 |
| 2015/0154166 A1* | 6/2015 | Allen | G06F 16/34 715/230 |
| 2015/0154177 A1* | 6/2015 | Allen | G06F 17/241 704/9 |
| 2015/0181291 A1* | 6/2015 | Wheatley | H04N 21/4542 725/10 |
| 2015/0229546 A1* | 8/2015 | Somaiya | G06F 11/328 715/736 |
| 2015/0271119 A1* | 9/2015 | Goncalves | H04L 51/16 709/206 |
| 2015/0315897 A1* | 11/2015 | Samuel | E21B 47/06 702/9 |
| 2015/0332603 A1* | 11/2015 | Aravkin | G09B 5/04 434/238 |
| 2015/0348157 A1* | 12/2015 | Garcia | G06Q 30/0625 705/26.62 |
| 2016/0063874 A1* | 3/2016 | Czerwinski | G06F 40/166 434/236 |
| 2016/0064038 A1* | 3/2016 | Ceracchini | H04N 21/8541 |
| 2016/0105708 A1* | 4/2016 | Packard | H04N 21/23439 725/10 |
| 2017/0083585 A1* | 3/2017 | Chen | G06F 16/248 |
| 2017/0124531 A1* | 5/2017 | McCormack | G06Q 10/06 |
| 2017/0372203 A1* | 12/2017 | Bharti | G06Q 10/10 |

OTHER PUBLICATIONS

Wei, et al. "TIARA: A Visual Exploratory Text Analytic System," *Proceedings of the 16th ACM SIGKDD*, 2010. pp. 153-162.

Lombardo, et al. "Visualization of Character's Intentions in Dramatic Media." 2013 Seventh International Conference on Complex, Intelligent, and Software Intensive Systems (CISIS), 2013. pp. 582-587.

* cited by examiner

CIRCULAR VISUAL REPRESENTATION OF MEDIA CONTENT

BACKGROUND

The increased efficiency with which digital forms of media content can be stored, copied, and distributed has resulted in ever more media content being produced and made available to users. As a result, the efficiency with which media content can be reviewed, evaluated, and managed has become increasingly important to producers of media content, media students and academics, and consumers of media content. For example, new alternatives to conventional time consuming approaches to performing media content analysis, such as storyline analysis performed through the study of written text, may advantageously reduce the time spent in media content evaluation.

Although techniques for evaluating a particular item of media content using storyline visualization have been developed, those techniques are largely limited to analysis of a single feature of a storyline, such as a single character or setting of the media content storyline. As a result, although conventional storyline visualization techniques can be used to analyze a single feature of a storyline, or may be applied iteratively to analyze multiple features within a single storyline, they are typically unsuitable for comparing multiple items of media content, each presenting its own complex storyline.

SUMMARY

There are provided systems and methods for visualizing media content, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, the efficiency with which media content can be reviewed, evaluated, and managed has become increasingly important to producers of media content, media students and academics, and consumers of media content. For example, new alternatives to conventional time consuming approaches to performing media content analysis, such as storyline analysis performed through the study of written text, may advantageously reduce the time spent in media content evaluation.

As further stated above, although techniques for evaluating a particular item of media content using storyline visualization have been developed, those techniques are largely limited to analysis of a single feature of a storyline, such as a single character or setting of the media content storyline. As a result, although conventional storyline visualization techniques can be used to analyze a single feature of a storyline, or may be applied iteratively to analyze multiple features within a single storyline, they are typically unsuitable for comparing multiple items of media content, each presenting its own complex storyline.

The present application discloses a media content visualization solution that addresses and overcomes the deficiencies in the conventional art by substantially optimizing the process of evaluating and comparing complex media content storylines. As is further described below, by generating a circular visual representation of primary media content (hereinafter "primary content") contained in a media file based on representative features of the primary content and metadata describing the primary content, the present application discloses a solution that advantageously classifies, and renders visually recognizable, the overall emotional tone of the primary content.

In addition, by enabling a user to interact with a circular visual representation of primary content through selection of a narrative setting or dramatic character included in the primary content, the present solution provides a powerful tool for exploration and evaluation of the primary content by the user. Moreover, by presenting the circular visual representation of the primary content so as to have a non-linear correspondence to at least one of the representative features of the primary content, the present application discloses a solution that advantageously enables a user to evaluate and compare media content from different perspectives, such as temporal or spatial perspectives, for example.

By way of example, some of the representative features of a primary content storyline may correspond to various temporal flows within the story. More specifically, a distinction can be drawn between "narrative time" and "story time" within a particular story line. As defined in the present application, narrative time is linear with respect to the advancement of the storyline. For instance where a storyline includes one hundred (100) scenes presented in order from 1-100, the narrative time of the story corresponds to advancement from scene 1 to scene 100 sequentially. However, many storylines include scenes that are so called flashbacks and address events in the past with respect to the storyline present. In addition, many storylines include dream sequence scenes or other dramatic contrivances for addressing events in the future with respect to the storyline present. As defined in the present application, those past and future events with respect to the story line present define a temporal flow that is linear with story time, i.e., past events precede present events and present events preceded future events in story time.

According to various implementations of the present inventive principles, narrative time and story time are both typically representative features of a particular primary content. The circular visual representation of the primary content generated by the systems and according to the methods disclosed in the present application may present some representative features as concentric circles or semicircles for which advancement in a clockwise (or counter-clockwise) direction is linear with respect to narrative time for example. In those implementations, and where the storyline includes flashbacks or addresses future events, the circular visual representation will be linear with respect to narrative time, but non-linear with respect to story time.

It is noted that, conversely, in some implementations in which advancement in a clockwise or counter-clockwise direction along circles or semicircles of the circular visual representation is linear with respect to story time, the circular visual representation may be non-linear with respect to narrative time. It is further noted that in some implementations, the circular visual representation may have a non-linear correspondence to representative features other than temporal features, such as spatial features, for example.

Figure 1:
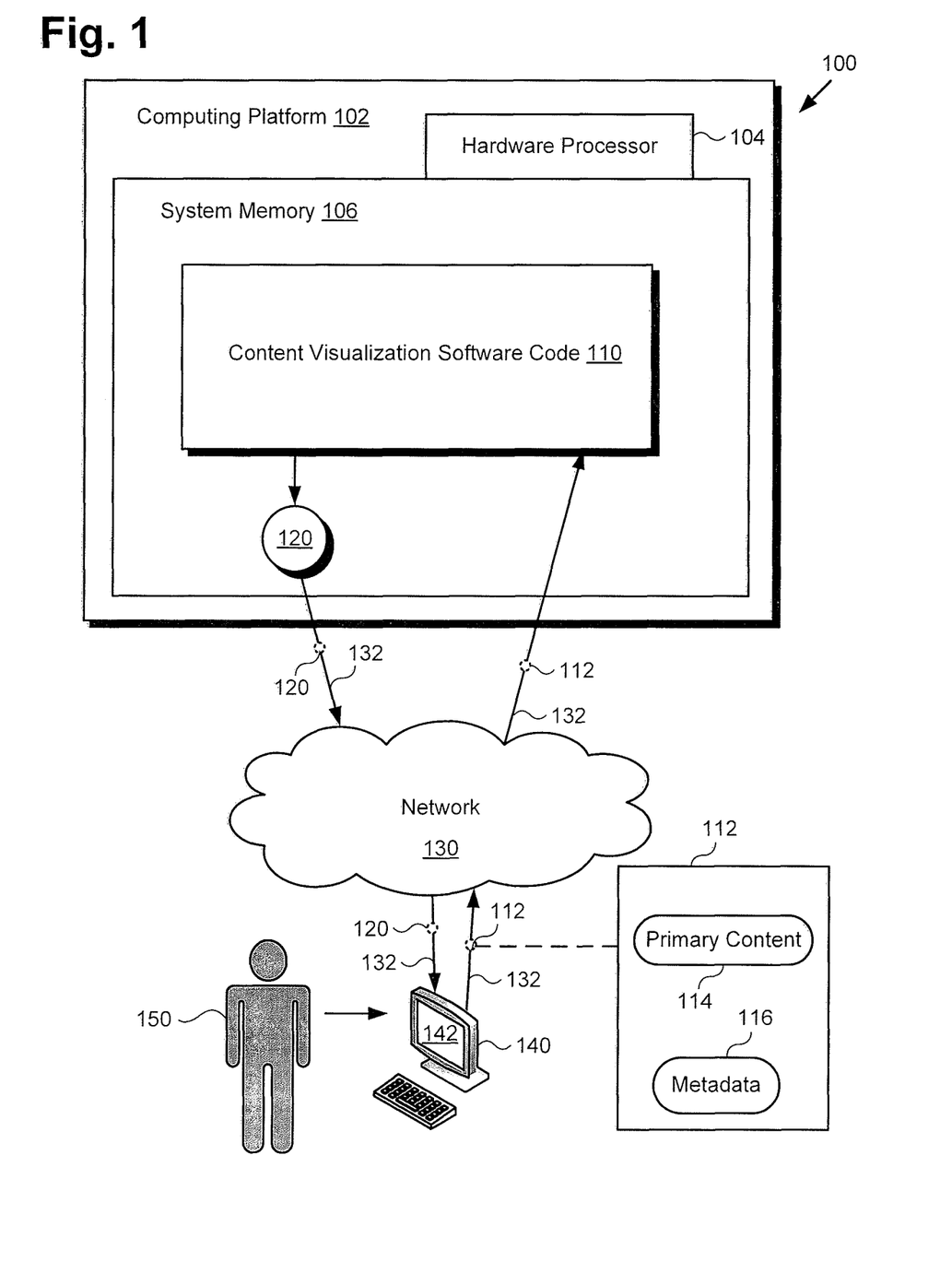
FIG. 1 shows a diagram of an exemplary system for visualizing media content, according to one implementation.

FIG. 1 shows a diagram of one exemplary implementation of a system for visualizing media content. As shown in FIG. 1, system 100 includes computing platform 102 having hardware processor 104, and system memory 106 implemented as a non-transitory storage device storing content visualization software code 110. As further shown in FIG. 1, system 100 is implemented within a use environment including communication network 130, client system 140 including display 142, and user 150 utilizing client system 140. Also shown in FIG. 1 are network communication links 132 interactively connecting client system 140 and system 100 via communication network 130, media file 112 including primary content 114 and metadata 116, and circular visual representation 120 of primary content 114, generated using content visualization software code 110.

It is noted that although FIG. 1 depicts content visualization software code 110 as being stored in its entirety in memory 106, that representation is merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100. Thus, it is to be understood that the various software modules included in content visualization software code 110 may be stored and/or executed using the distributed memory and/or processor resources of system 100.

According to the implementation shown by FIG. 1, user 150 may utilize client system 140 to interact with system 100 over communication network 130. In one such implementation, system 100 may correspond to one or more web servers, accessible over a packet network such as the Internet, for example. Alternatively, system 100 may correspond to one or more computer servers supporting a local area network (LAN), or included in another type of limited distribution network.

Although client system 140 is shown as a personal computer (PC) in FIG. 1, that representation is also provided merely as an example. In other implementations, client system 140 may be any other suitable mobile or stationary computing device or system. For example, in other implementations, client system 140 may take the form of a laptop computer, tablet computer, digital media player, gaming console, or smartphone, for example. User 150 may utilize client system 140 to interact with system 100 to use content visualization software code 110, executed by hardware processor 104, to generate circular visual representation 120 of primary content 114 included in media file 112.

It is noted that, in various implementations, circular visual representation 120, when generated using content visualization software code 110, may be stored in system memory 106 and/or may be copied to non-volatile storage (not shown in FIG. 1). Alternatively, or in addition, and as shown in FIG. 1, in some implementations, circular visual representation 120 may be sent to client system 140 including display 142, for example by being transferred via network communication links 132 of communication network 130. It is further noted that display 142 may take the form of a liquid crystal display (LCD), a light-emitting diode (LED) display, an organic light-emitting diode (OLED) display, or another suitable display screen that performs a physical transformation of signals to light.

Figure 2:
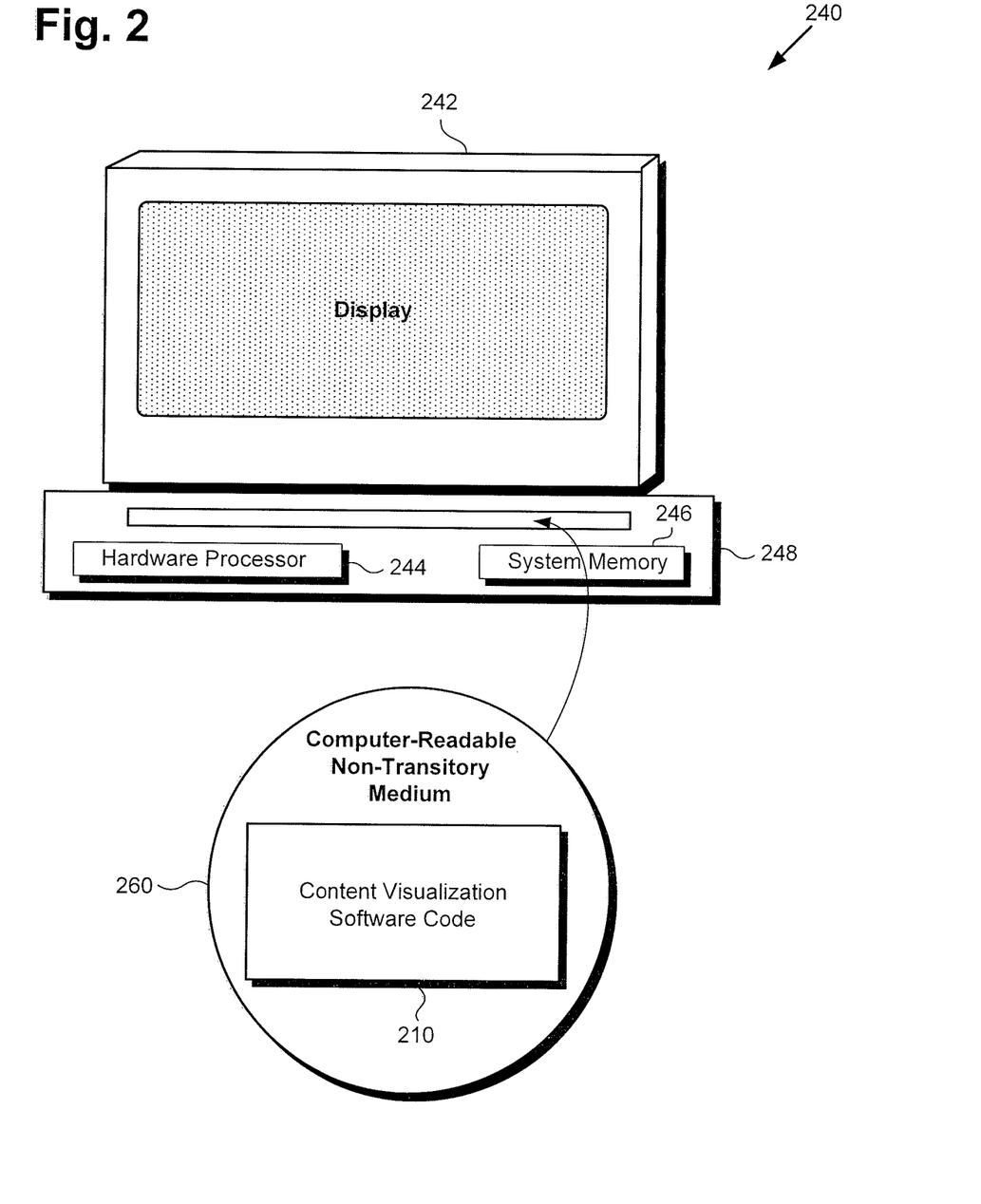
FIG. 2 shows an exemplary system and a computer-readable non-transitory medium including instructions enabling execution of a method for visualizing media content, according to one implementation.

FIG. 2 shows exemplary system 240 and computer-readable non-transitory medium 260 including instructions enabling execution of a method for visualizing media content, according to one implementation. System 240 includes computer 248 having hardware processor 244 and system memory 246, interactively linked to display 242. Display 242 may take the form of an LCD, LED display, OLED display, or another suitable display screen that performs a physical transformation of signals to light. System 240 including display 242 and computer 248 having hardware processor 244 and system memory 246 corresponds in general to client system 140 including display 142, in FIG. 1.

Also shown in FIG. 2 is computer-readable non-transitory medium 260 having content visualization software code 210 stored thereon. The expression "computer-readable non-transitory medium," as used in the present application, refers to any medium, excluding a carrier wave or other transitory signal, that provides instructions to hardware processor 244 of computer 248. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 260 provides content visualization software code 210 for execution by hardware processor 244 of computer 248. Content visualization software code 210 corresponds in general to content visualization software code 110, in FIG. 1, and is capable of performing all of the operations attributed to that corresponding feature by the present disclosure. In other words, in implementations in which hardware processor 244 of system 140/240 accesses computer-readable non-transitory medium 260 and executes content visualization software code 210, system 140/240 may perform any of the actions attributed to system 100 by the present disclosure.

Figure 3:
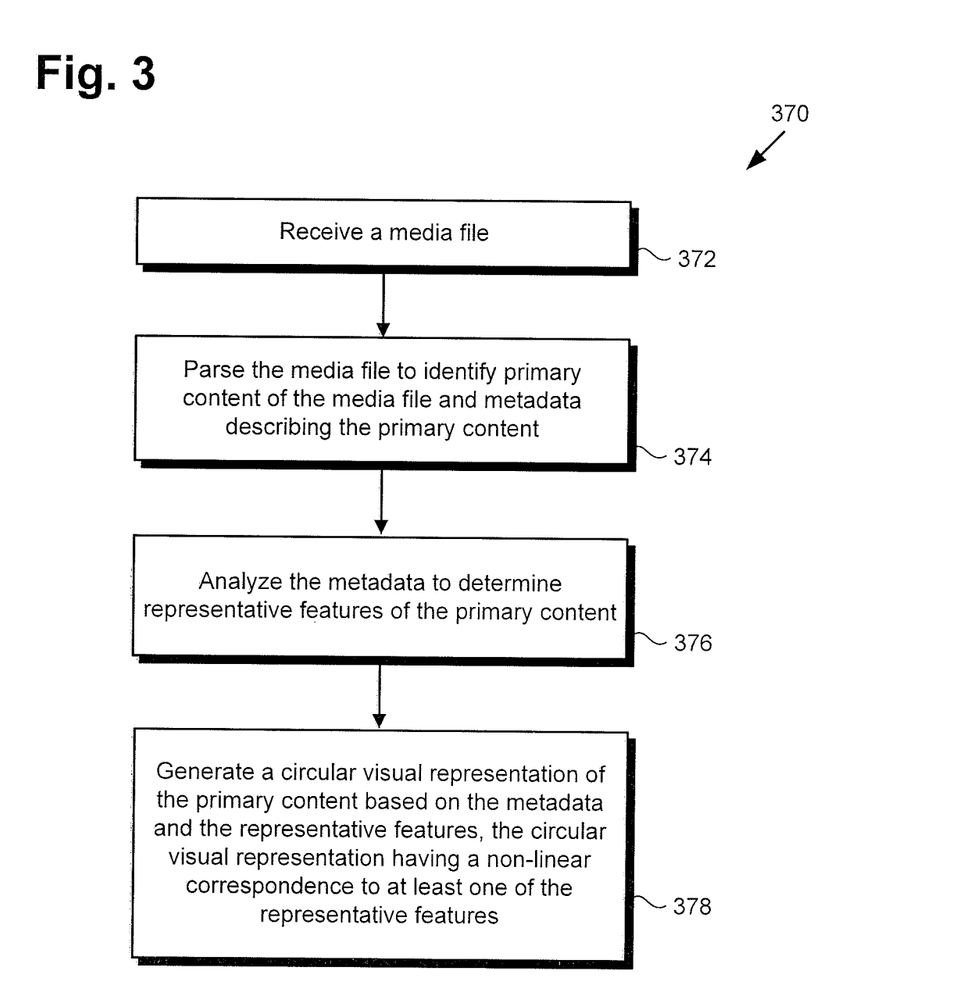
FIG. 3 shows a flowchart presenting an exemplary method for visualizing media content, according to one implementation.
Figure 4:
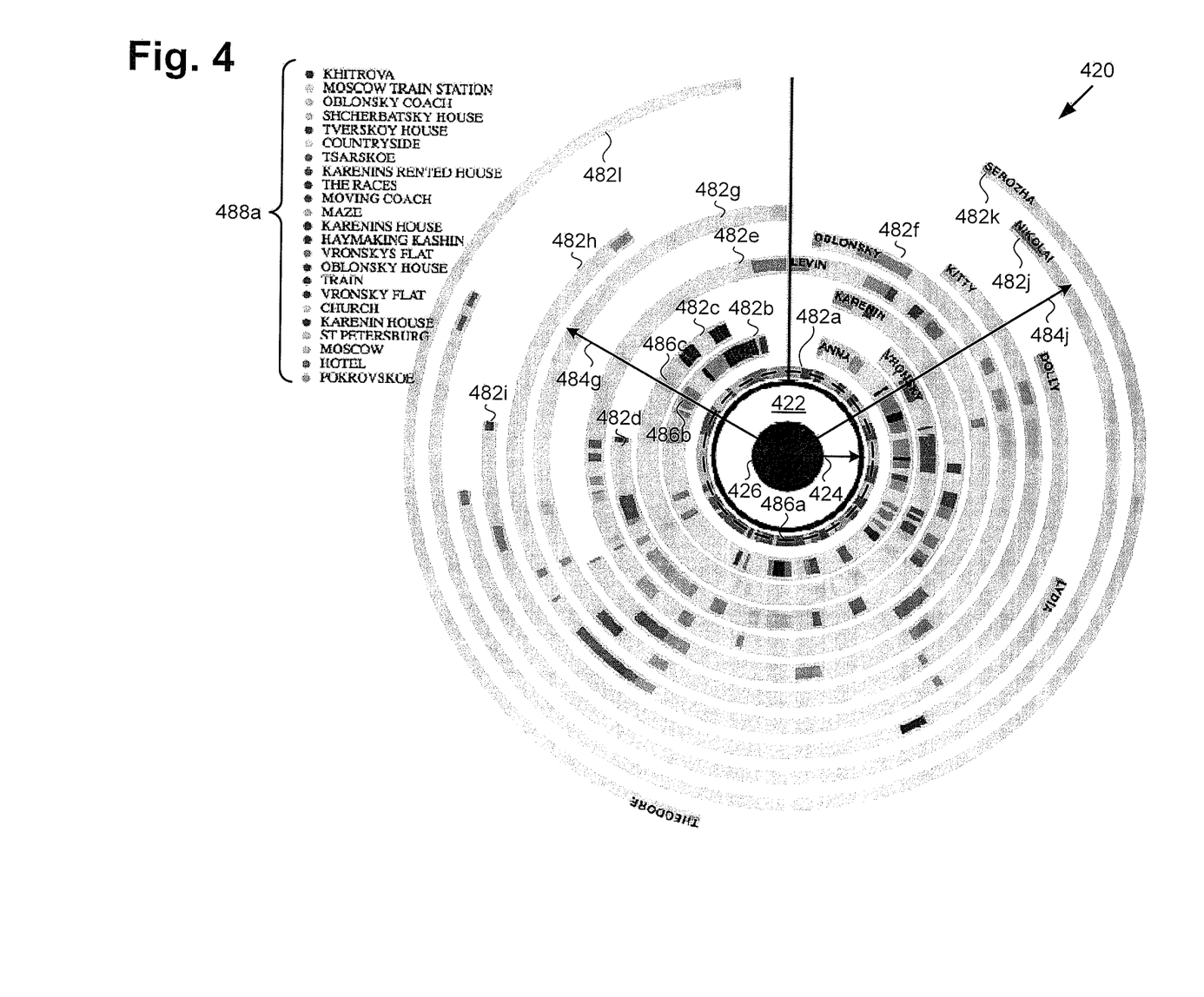
FIG. 4 shows an exemplary circular visual representation of media content, according to one implementation.
Figure 5:
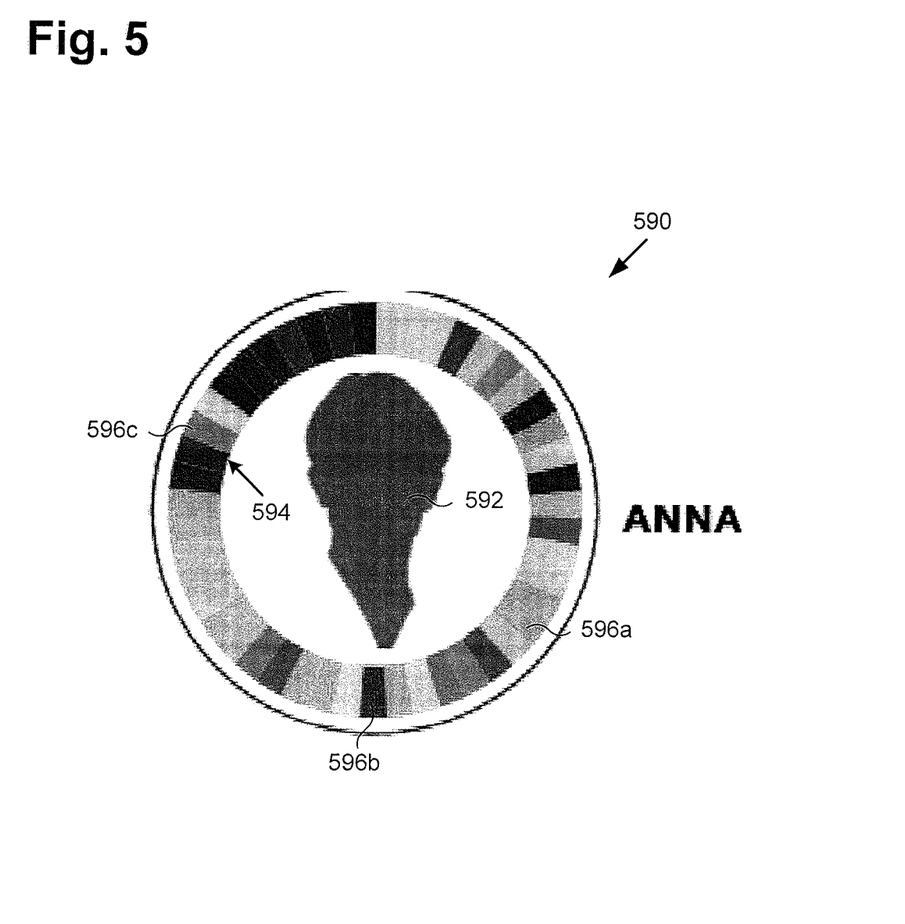
FIG. 5 shows an exemplary visualization of a dramatic character included in media content, according to one implementation.

The functionality of content visualization software code 110/210 will be further described by reference to FIG. 3 in combination with FIGS. 1, 2, 4, and 5. FIG. 3 shows flowchart 370 presenting an exemplary method for use by a system, such as system 100/140/240, for visualizing media content. FIG. 4 shows exemplary circular visual representation 420 of primary content 114 included in media file 112, according to one implementation, while FIG. 5 shows exemplary visualization 590 of a dramatic character included in primary content 114, according to one implementation.

Referring now to FIG. 3 in combination with FIGS. 1 and 2, flowchart 370 begins with receiving media file 112 (action 372). By way of example, user 150 may utilize client system 140 to interact with system 100 in order to generate circular visual representation 120 of primary content contained in media file 112. As shown by FIG. 1, in one implementation, user 150 may do so by transmitting media file 112 from client system 140 to system 100 via communication network 130 and network communication links 132. Alternatively, media file 112 may be received from a third party source of media content, or may reside as a stored media file in system memory 106/246. Media file 112 may be received by content visualization software code 110/210, executed by hardware processor 104/244.

Flowchart 370 continues with parsing media file 112 to identify primary content 114 of media file 112 and metadata 116 describing primary content 114 (action 374). Primary content 114 may be any type of content having a predetermined order for its presentation that includes one or more non-linearities with respect to temporal flow or with respect to spatial aspects of primary content 114. Thus, media file 112 may include primary content 114 in the form of one of a movie script, a play script, a digital book, poetry, one or more episodes of a television series, animation, or a game, to name merely a few examples. In addition, media file 112 may include metadata 116 describing primary content 114.

For example, in implementations in which primary content 114 is a movie script, metadata 116 describing primary content 114 may identify dramatic characters, interactions among dramatic character's, and/or narrative setting included in the movie script. Parsing of media file 112 to identify primary content 114 and metadata 116 may be performed by content visualization software code 110/210, executed by hardware processor 104/244.

Flowchart 370 continues with analyzing metadata 116 to determine representative features of primary content 114 (action 376). Examples of such representative features may include narrative time, story time, narrative settings, the inclusion of dramatic characters in various narrative settings, the prominence of dramatic characters with respect to the storyline, interactions among dramatic characters, and the emotional state or mood of dramatic characters, to name a few. Analysis of metadata 116 and determination of representative features of primary content 114 may be performed by content visualization software code 110/210, executed by hardware processor 104/244.

Flowchart 370 continues with generating circular visual representation 120 of primary content 114 based on metadata 116 and the representative features of primary content 114 determined in action 376 (action 378). Generation of circular visual representation 120 of primary content 114 based on metadata 116 and the representative features of primary content 114 may be performed by content visualization software code 110/210, executed by hardware processor 104/244.

Referring to FIG. 4, FIG. 4 shows exemplary circular visual representation 420 of primary content 114 included in media file 112, according to one implementation. It is noted that circular visual representation 420 corresponds in general to circular visual representation 120, in FIG. 1. Consequently, both of circular visual representations 120 and 420, in respective FIGS. 1 and 4, may share any of the characteristics attributed to either feature in the present application.

As shown in FIG. 4, circular visual representation 120/420 includes central circle 422 having central radius 424, and multiple at least semicircular segments 482a, 482b, 482c, 482d, 482e, 482f, 482g, 482h, 482i, 482j, 482k, and 482l (hereinafter "at least semicircular segments 482a-482l"), which may be concentric with central circle 422. In addition, and as further shown by exemplary radii 484g and 484j of respective at least semicircular segments 482g and 482j, each of at least semicircular segments 482a-482l has a respective radius greater than central radius 424.

According to the exemplary implementation shown in FIG. 4, central circle 422 includes visual cue 426 corresponding to an overall emotional tone of primary content 114. Visual cue 426 may be a representative color or pattern filling, or partially filling, central circle, for example. As a specific example, where visual cue 426 is a color, the color may range through shades of green corresponding to positive, optimistic, and happy emotional states, yellow corresponding to more neutral emotions, and red corresponding to negative, sad, and/or angry emotions.

Moreover, according to the exemplary implementation shown in FIG. 4, one of at least semicircular segments 482a-482l (i.e., 482a) is full circle or ring 482a adjoining central circle 422. As shown in FIG. 4, ring 482a includes visual cues, represented by exemplary visual cue 486a, corresponding respectively to narrative settings 488a included in primary content 114. In addition to full circle or ring 482a corresponding to narrative settings within primary content 114, each of at least semicircular segments 482b-482l corresponds respectively to a dramatic character of primary content 114 and includes visual cues exemplified by visual cues 486b and 486c on respective at least semicircular segments 482b and 482c.

It is noted that, as discussed above by reference to visual cue 426 of central circle 422, visual cues included on any of at least semicircular segments 482a-482l, such as exemplary visual cues 486a, 486b, and 486c, may be shown as distinctive colors or patterns. It is further noted that the colors or patterns of visual cues shown on at least semicircular segments 482b-482l corresponding respectively to dramatic characters may be representative of their respective emotions when they appear in the narrative setting bisected by the same radial line.

For example, dramatic character 482b (Anna) is shown to experience a positive emotional state by green visual cue 486b when Anna is in the narrative setting corresponding to the point of ring 482a bisected by radial line 484g. By contrast, dramatic character 482c (Vronsky) is shown to experience a neutral emotional state by yellow visual cue 486c when Vronsky is in the same narrative setting. It is also noted that the absence of patterning, color, or another visual cue along portions of at least semicircular segments 482b-482l indicates that the respective character corresponding to the at least semicircular segment does not appear in the narrative setting bisected by the same radial line.

According to the exemplary implementation shown in FIG. 4, a clockwise advancement along at least semicircular segments 482a-482l is linear with respect to the narrative time of primary content 114. For example, at least semicircular segments 482b and 482c corresponding respectively to dramatic characters Anna and Vronsky begin with their respective first appearances in a narrative setting of primary content 114 and end with their final appearance in such a setting. Thus, it is apparent from circular visual representation 420 that Vronsky is introduced later in narrative time than Anna, and makes his final appearance earlier in narrative time that Anna's final appearance.

As discussed above, narrative time and story time are both typically representative features of primary content 114.

However, any flashback scenes or future looking scenes included in primary content 114 are depicted by circular visual representation 420 as being out of order with respect to the chronology of story time. Consequently, according to the exemplary implementation shown in FIG. 4, a clockwise advancement along at least semicircular segments 482a-482l is non-linear with respect to advancement of the story time of primary content 114. That is to say, circular visual representation 120/420 has a non-linear correspondence to at least one of the representative features of primary content 114, i.e., the story time of primary content 114.

In some implementations, the exemplary method outlined in flowchart 370 may further include rendering circular visual representation 120/420 of primary content 114 for display to system user 150. For example, circular visual representation 120/420 may be rendered for display to system user 150 on display 142/242 of system 140/240. Rendering of circular visual representation 120/420 may be performed by content visualization software code 110/210, executed by hardware processor 104/244.

Moreover, in some implementations, circular visual representation 120/420 of primary content 114 may be interactive, thereby enabling system user 150 to navigate through and selectively explore portions of primary content 114. In those implementations, hardware processor 104/244 may execute content visualization software code 110/210 to receive an input from system user 150 for selecting one of at least semicircular segments 482a-482l. Moreover, in an exemplary implementation in which system 100/140/240 receives an input from system user 150 for selecting one of at least semicircular segment 482b-482l corresponding to a dramatic character of primary content 114, hardware processor 104/244 may further execute content visualization software code 110/210 to generate a visualization corresponding to the dramatic character.

Referring to FIG. 5, FIG. 5 shows exemplary visualization 590 of the dramatic character Anna included in primary content 114 of media file 112 and corresponding to at least semicircular segment 482b, in FIG. 4, according to one implementation. As shown in FIG. 5, visualization 590 of Anna includes avatar 592 of Anna encircled by ring 594 including visual cues exemplified by visual cues 596a, 596b, and 596c. Such visual cues may be shown as colors or patterns, for example, and may correspond to changes in an emotional state of Anna during advancement of one of the narrative time and the story time of primary content 114. Analogous visualizations may be generated for any dramatic character corresponding respectively to one of at least semicircular segment 482b-482l.

As noted above, where visual cues such as 596a, 596b, and 596c are shown as colors, those colors may range through shades of green corresponding to positive, optimistic, and happy emotional states, yellow corresponding to more neutral emotions, and red corresponding to negative, sad, and/or angry emotions. As a result, exemplary visualization 590 displays the temporal evolution of Anna's emotional state during the advancement of one of the narrative time and the story time of primary content 114.

Thus, the present application discloses a media content visualization solution that substantially optimizes the process of evaluating and comparing complex media content storylines. By generating a circular visual representation of primary content contained in a media file based on representative features of the primary content and metadata contained in the media file, the present application discloses a solution that advantageously classifies, and renders visually recognizable, the overall emotional tone of the primary content. By further enabling a user to interact with the circular visual representation through selection of a narrative setting or dramatic character included in the primary content, the present solution provides a powerful tool for exploration and evaluation of the primary content by the user. Moreover, by presenting the circular visual representation of the primary content so as to have a non-linear correspondence to at least one of the representative features of the primary content, the present application discloses a solution that advantageously enables a user to evaluate and compare primary content storylines from different perspectives.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for visualizing a media content, the system comprising:
   a computing platform including a hardware processor and a system memory;
   a content visualization software code stored in the system memory;
   the hardware processor configured to execute the content visualization software code to:
   receive a media content having a story and metadata describing the media content;
   analyze the metadata to determine representative features of the media content, wherein the representative features include an overall emotional tone of the media content; and
   generate a circular visual representation of the media content based on the metadata and the representative features, the circular visual representation including a central circle surrounded by a ring, the ring having a ring radius and being concentric with a plurality of concentric semicircular segments each having a respective radius greater than the ring radius;
   wherein the central circle includes a visual cue corresponding to the overall emotional tone of the media content;
   wherein the ring is a full circle and each of the plurality of concentric semicircular segments is a partial circle, wherein the ring includes visual cues each corresponding to one of a plurality of narrative settings within the story;
   wherein each of the plurality of concentric semicircular segments is directed to a different one of a plurality of characters in the story;
   wherein a first semicircular segment of the plurality of concentric semicircular segments is directed to a first character of the plurality of characters in the story and has a first radius greater than the ring radius, wherein an absence of a visual cue along a portion of the first semicircular segment indicates that the first character does not appear in a first narrative setting of the plurality of narrative settings where the first narrative setting is bisected by a radial line.

2. The system of claim 1, wherein the media content is one of a movie script, a play script, a digital book, poetry, one or more episodes of a television series, animation, or a game.

3. The system of claim 1, wherein the hardware processor is further configured to execute the content visualization software code to render the circular visual representation of the media content for display to a system user.

4. The system of claim 3, wherein the hardware processor is further configured to execute the content visualization software code to receive an input from the system user for selecting one of the plurality of concentric semicircular segments.

5. The system of claim 1, wherein the hardware processor is further configured to execute the content visualization software code to generate a visualization corresponding to one of the plurality of characters in response to an input received from a system user for selecting the one of the plurality of characters.

6. The system of claim 5, wherein the visualization of the one of the plurality of characters selected by the system user includes an avatar of the one of the plurality of characters encircled by a character ring including visual cues corresponding to changes in an emotional state of the one of the plurality of characters during the advancement of the narrative time.

7. The system of claim 1, wherein each of the plurality of concentric semicircular segments includes a plurality of visual cues of character emotions.

8. The system of claim 1, wherein the plurality of narrative settings include geographic locations.

9. The system of claim 1, wherein each of the plurality of concentric semicircular segments begins with a first appearance of each respective one of the plurality of characters in the story and ends with a last appearance of each respective one of the plurality of characters in the story, and wherein each of the plurality of concentric semicircular segments advances linearly with respect to a narrative time of the story.

10. The system of claim 9, wherein the story includes at least one flashback scene or future looking scene that is out of order with respect to a chronology of a story time, and wherein advancement along at least one of the plurality of concentric semicircular segments is non-linear with respect to advancement of the story time.

11. A method for use by a system including a computing platform having a hardware processor and a system memory storing a content visualization software code, the method comprising:

receiving, using the hardware processor, a media content having a story and metadata describing the media content;

analyzing, using the hardware processor, the metadata to determine representative features of the media content, wherein the representative features include an overall emotional tone of the media content; and generating, using the hardware processor, a circular visual representation of the media content based on the metadata and the representative features, the circular visual representation including a central circle surrounded by a ring, the ring having a ring radius and being concentric with a plurality of concentric semicircular segments each having a respective radius greater than the ring radius;

wherein the central circle includes a visual cue corresponding to the overall emotional tone of the media content;

wherein the ring is a full circle and each of the plurality of concentric semicircular segments is a partial circle, wherein the ring includes visual cues each corresponding to one of a plurality of narrative settings within the story;

wherein each of the plurality of concentric semicircular segments is directed to a different one of a plurality of characters in the story;

wherein a first semicircular segment of the plurality of concentric semicircular segments is directed to a first character of the plurality of characters in the story and has a first radius greater than the ring radius, wherein an absence of a visual cue along a portion of the first semicircular segment indicates that the first character does not appear in a first narrative setting of the plurality of narrative settings where the first narrative setting is bisected by a radial line.

12. The method of claim 11, wherein the media content is one of a movie script, a play script, a digital book, poetry, one or more episodes of a television series, animation, or a game.

13. The method of claim 11, further comprising rendering, using the hardware processor, the circular visual representation of the media content for display to a system user.

14. The method of claim 13, further comprising receiving, using the hardware processor, an input from the system user for selecting one of the plurality of concentric semicircular segments.

15. The method of claim 11, further comprising generating, using the hardware processor, a visualization of one of the plurality of characters in response to an input from a system user for selecting the one of the plurality of characters.

16. The method of claim 15, wherein the visualization of the one of the plurality of characters selected by the system user includes an avatar of the one of the plurality of characters encircled by a character ring including visual cues corresponding to changes in an emotional state of the one of the plurality of characters during the advancement of the narrative time.

17. The method of claim 11, wherein each of the plurality of concentric semicircular segments includes a plurality of visual cues of character emotions.

18. The method of claim 11, wherein the plurality of narrative settings include geographic locations.

19. The method of claim 11, wherein each of the plurality of concentric semicircular segments begins with a first appearance of each respective one of the plurality of characters in the story and ends with a last appearance of each respective one of the plurality of characters in the story, and wherein each of the plurality of concentric semicircular segments advances linearly with respect to a narrative time of the story.

20. The method of claim 19, wherein the story includes at least one flashback scene or future looking scene that is out of order with respect to a chronology of a story time, and wherein advancement along at least one of the plurality of concentric semicircular segments is non-linear with respect to advancement of the story time.

21. A system for visualizing a media content, the system comprising:
- a computing platform including a hardware processor and a system memory;
- a content visualization software code stored in the system memory;
- the hardware processor configured to execute the content visualization software code to:
  - receive a media content having a story and metadata describing the media content;
  - analyze the metadata to determine representative features of the media content, wherein the representative features include an overall emotional tone of the media content; and
  - generate a circular visual representation of the media content based on the metadata and the representative features, the circular visual representation including a central circle surrounded by a ring, the ring having a ring radius and being concentric with at least one concentric semicircular segment having a radius greater than the ring radius;
- wherein the central circle includes a visual cue corresponding to the overall emotional tone of the media content;
- wherein the ring is a full circle and the at least one concentric semicircular segment is a partial circle, wherein the ring includes visual cues each corresponding to one of a plurality of narrative settings within the story;
- wherein the at least one concentric semicircular segment is directed to a character in the story;
- wherein a first semicircular segment of the at least one concentric semicircular segment is directed to the character in the story and has a first radius greater than the ring radius, wherein an absence of a visual cue along a portion of the first semicircular segment indicates that the character does not appear in a first narrative setting of the plurality of narrative settings where the first narrative setting is bisected by a radial line.

* * * * *